US008051077B2

(12) United States Patent
Carter

(10) Patent No.: US 8,051,077 B2
(45) Date of Patent: Nov. 1, 2011

(54) GEO-TRIP NOTES

(75) Inventor: Paul Patrick Carter, Paeonian Springs, VA (US)

(73) Assignee: Maphook, Inc., Paeonian Springs, VA (US)

( * ) Notice: Subject to any disclaimer, the term of this patent is extended or adjusted under 35 U.S.C. 154(b) by 371 days.

(21) Appl. No.: 12/035,114

(22) Filed: Feb. 21, 2008

(65) Prior Publication Data
US 2009/0216733 A1 Aug. 27, 2009

(51) Int. Cl.
*G06F 17/30* (2006.01)
(52) U.S. Cl. ........................................ 707/724
(58) Field of Classification Search .................. 707/724; 455/456.1, 457
See application file for complete search history.

(56) References Cited

U.S. PATENT DOCUMENTS

| | | | |
|---|---|---|---|
| 5,852,775 A | 12/1998 | Hidary | |
| 6,119,014 A | 9/2000 | Alperovich | |
| 6,377,793 B1 | 4/2002 | Jenkins | |
| 6,480,713 B2 | 11/2002 | Jenkins | |
| 6,625,456 B1 | 9/2003 | Busso | |
| 6,647,257 B2 | 11/2003 | Owensby | |
| 6,668,177 B2 | 12/2003 | Salmimaa | |
| 6,681,107 B2 | 1/2004 | Jenkins | |
| 6,988,103 B2 * | 1/2006 | Chithambaram et al. | 707/724 |
| 7,526,470 B1 * | 4/2009 | Karnawat et al. | 1/1 |
| 2002/0177435 A1 | 11/2002 | Jenkins | |
| 2003/0036848 A1 * | 2/2003 | Sheha et al. | 701/209 |
| 2003/0040324 A1 * | 2/2003 | Eldering et al. | 455/456 |
| 2005/0085187 A1 | 4/2005 | Jendbro | |
| 2005/0160014 A1 * | 7/2005 | Moss et al. | 705/26 |
| 2005/0234904 A1 * | 10/2005 | Brill et al. | 707/724 |
| 2006/0089160 A1 * | 4/2006 | Othmer | 455/457 |
| 2006/0238381 A1 | 10/2006 | Kimchi | |
| 2007/0032244 A1 * | 2/2007 | Counts et al. | 455/456.1 |
| 2007/0143122 A1 * | 6/2007 | Holloway et al. | 705/1 |
| 2007/0161382 A1 | 7/2007 | Melinger | |
| 2008/0114739 A1 * | 5/2008 | Hayes | 707/3 |
| 2008/0281808 A1 * | 11/2008 | Anderson et al. | 707/5 |

OTHER PUBLICATIONS http://www.geonames.org/ (first visited Jan. 2008).
http://www.geonames.org/search.html?q=white+house&country= (first visited Jan. 2008).
Tony Tulathimutte, et al., "Facilitating Playful Exploration: A Persuasive Mobile Guide", CS376: Research Topics in Human-Computer Interaction, Autumn Quarter 2005, Project Milestone #2.

(Continued)

*Primary Examiner* — James Trujillo
*Assistant Examiner* — William Spieler
(74) *Attorney, Agent, or Firm* — Banner & Witcoff, Ltd.

(57) ABSTRACT

A user may use a mobile device to request information related to a selected topic or a point of interest. A location of the mobile device may be determined in order to provide the user with informational content related to the selected topic or point of interest in close proximity to the user. The mobile device may receive and display the informational content as a set of search results. The user may select one or more of the search results in order to review the information content referenced by the selected one or more search results. A verification process or step may ensure that the selected information is relevant to the selected topic or determined location, and a link may be generated relating the topic, the selected search result(s), and the determined mobile device location. Moreover, a rating system may be used to provide an indication of the relevancy of one or more search results. Thereafter, additional users, or the same users, may be provided access to the link when located in close proximity to the determined location.

23 Claims, 7 Drawing Sheets

Application Diagram

OTHER PUBLICATIONS

Mauro Cherubini, "Collaborative Annotations of Space in a Mobile Context: a Computational Model that integrates spatial information and communication", Center for Research and Support of Training and its Technologies (CRAFT), Ecole Polytechnique Federale de Lausanne, Jun. 15, 2005.

Tzvetan Horozov, et al., "Using localization for personalized POI recommendations in mobile environments", (first visited Dec. 18, 2007 at http://horozov.org/tzvetan/docs/icccn.pdf).

Rainer Simon, et al., "A Mobile Application Framework for the Geospatial Web", Telecommunications Research Center Vienna, Vienna, Austria, May 8-12, 2007.

Eoghan Parle, et al., "Proximo, Location-Aware Collaborative Recommender", UCD School of Computer Science & Informatics, University College Dublin, Belfield, Ireland (first visited Dec. 18, 2007 at http://www.sis.pitt.edu/~paws/SNC_BAT06/crc/parle.pdf).

Matt Duckman, et al., "Location privacy location-aware computing", University of Melbourne, Australia, (first visited Dec. 18, 2007 at http://www.geosensor.net/papers/duckham06.IGIS.pdf).

Steve Jones, "Geo-ripping Wikipedia", (first visited Dec. 10, 2007 at http://service-architecture.blogspot.com/2006/11/geo-ripping-wikipedia.html), Nov. 7, 2006.

GeoNotes 1.0 User Manual (printed Apr. 15, 2002).

Frederick Espinoza, et al., "GeoNotes: Social and Navigational Aspects of Location-Based Information Systems", Humle Lab, Swedish Institute of Computer Science (SICS), Kista, Sweden, 2001.

Frederick Espinoza, et al., "GeoNotes: Social and Navigational Aspects of Location-Based Information Systems", Humle Lab, Swedish Institute of Computer Science (SICS), Kista, Sweden, 1999. GeoNotes (visited at htto://geonotes.sics.se/).

Frederick Espinoza, et al., "GeoNotes", (first visited Apr. 9, 2007 at http://www.perpersson.net/projectsGeoNotes.htm).

Mana Tungare, et al., "Evaluation of a Location-Linked Notes System", Proceedings of the 44th Annual Southeast Regional Conference (Melbourne, Florida, Mar. 10-12, 2006), ACM Press, New York, pp. 494-499.

Jenna Burrell, et al., "E-graffiti: Evaluating Real-world Use of a Context-Aware System", Interacting with Computers, vol. 14, Issue 4, 2002, pp. 301-312.

E.L. Koua, "Using Self-Organizing Maps for Information Visualization and Knowledge Discovery in Complex Geospatial Datasets", International Institute for Geo-Information Science and Earth Observation (ITC), Document Transformation Technologies, Netherlands, Aug. 10-16, 2003.

Jonna Hakkila et al., "Interaction in Location-Aware Messaging in a City Environment", Computing and Information Technology, Griffith University, Australia.

* cited by examiner

GEO-TRIP NOTES

FIELD

Aspects of the invention generally relate to wireless computing technologies. More specifically, an apparatus, method and system are described for providing an ability to acquire information related to a location responsive to a mobile terminal being located within a threshold distance of the location.

BACKGROUND

Improvements in computing technologies have changed the way people interact with their surrounding environment. For example, competitive business has dictated that information be available on demand. The conveniences associated with having such ready access to information in the marketplace has resulted in a similar demand on a personal-level; users of mobile technology now expect to have access to timely and accurate information in almost any environment or setting.

To date, the Internet has facilitated tremendous growth in terms of the amount of information available to technology users. For example, web sites such as Wikipedia.org, Angieslist.com, Doctors.com, Dnb.com, fodors.com, and zagat.com offer users information related to a variety of topics. As the amount of information available increases, however, it becomes increasingly more difficult for users to locate information that is of the greatest relevancy. This often results in a user having to engage in a time-consuming search process to pinpoint specific information that the user is looking for.

Thus, what is needed in the art is an improved ability to acquire timely, relevant, and accurate information. Furthermore, what is needed is an improved ability to obtain information related to a point of interest or destination based on one or more users' locations.

BRIEF SUMMARY

The following presents a simplified summary of aspects of the invention in order to provide a basic understanding of some aspects of the invention. This summary is not an extensive overview, and is not intended to identify key or critical elements or to delineate the scope of the claims. The following summary merely presents some concepts and aspects of the invention in a simplified form as a prelude to the more detailed description provided below.

Aspects of the present invention are directed to a novel apparatus, method and system for generating and transmitting information to a computer platform. Aspects may provide for determining a location of a first computing platform, searching for and receiving informational content (e.g., search results) related to the determined location, selecting, filtering, and verifying the informational content, and storing a link relating the selected, filtered and verified informational content to the determined location of the first computing platform. Additional aspects may provide for subsequently determining a location of a second computing platform, and transmitting the stored link to the second computing platform when the determined location of the second computing platform is within a threshold distance of the previously determined location of the first computing platform.

A first aspect provides for determining a location of a first computing platform.

A second aspect provides for searching for and retrieving informational content related to the determined location of the first computing platform.

A third aspect provides for selecting, filtering, and verifying the informational content.

A fourth aspect provides for storing a link relating the selected, filtered and verified informational content to the determined location of the first computing platform.

A fifth aspect provides for determining a location of a second computing platform.

A sixth aspect provides for transmitting the stored link to the second computing platform when the determined location of the second computing platform is within a threshold distance of the previously determined location of the first computing platform.

A seventh aspect provides for verifying at the second computing platform that the informational content is relevant and accurate with respect to the determined location.

These and other aspects of the invention generally relate to determining a location of a first computing platform and searching for and retrieving informational content related to the determined location of the first computing platform. Responsive to obtaining the informational content, the first computing platform, or a user of the first computing platform, may select, filter, and verify the informational content. Responsive to selecting, filtering, or verifying the informational content, one or more links may be stored relating the selected, filtered, or verified informational content to the determined location of the first computing platform. Thereafter, when a second computing platform is determined to be located within a proximate distance of the previously determined location of the first computing device and when an interest is expressed for information related to the previously selected, filtered and verified informational content, the second computing platform may receive the previously selected, filtered and verified informational content

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which one or more aspects of the invention may be practiced. It is to be understood that other embodiments may be utilized and structural and functional modifications may be made without departing from the scope of the present invention.

Figure 1:
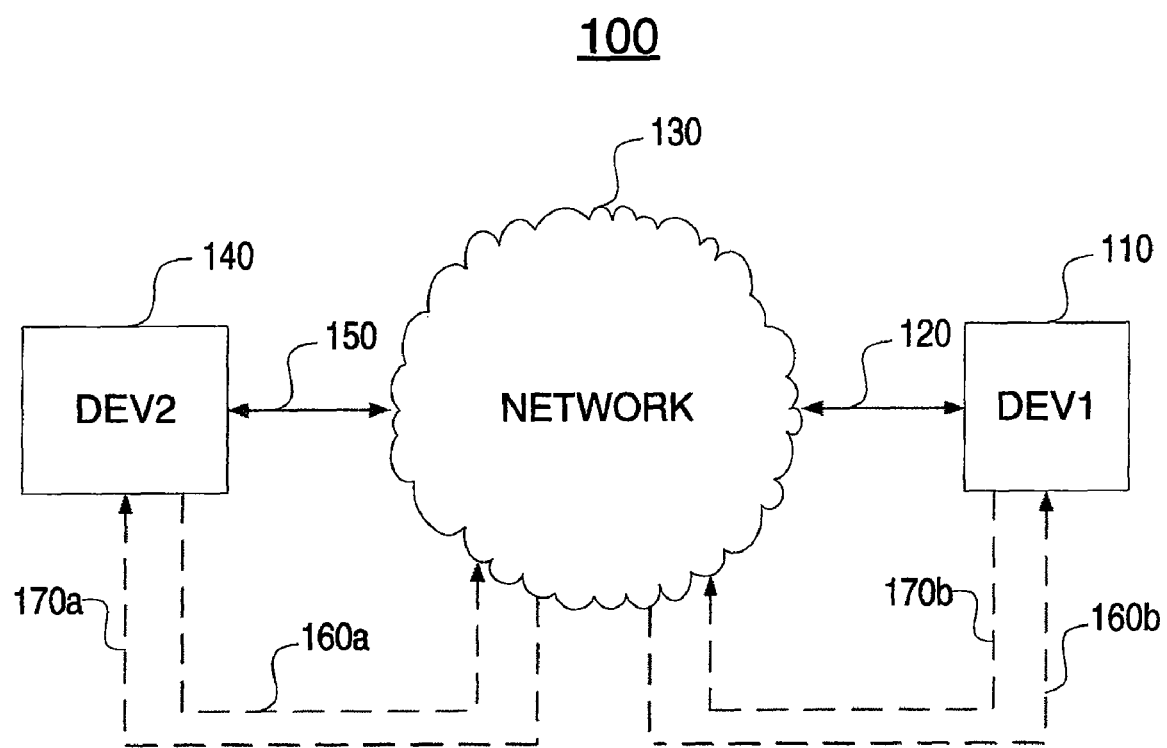
FIG. 1 illustrates a network computing environment suitable for carrying out one or more illustrative aspects of the invention.

FIG. 1 illustrates a network computing environment 100 suitable for carrying out one or more aspects of the present invention. For example, FIG. 1 illustrates a first device DEV1 110 connected to a network 130 via a connection 120. Network 130 may include the Internet, an intranet, wired or wireless networks, or any other mechanism suitable for facilitating communication between computing platforms in general. FIG. 1 also depicts a second device DEV2 140 connected to network 130 via a connection 150. By virtue of the connectivity as shown, DEV1 110 and DEV2 140 may communicate with one another. Such communications may enable the exchange of various types of information. For example, the communications may include data to be exchanged between DEV1 110 and DEV2 140. Such data may include text files, pictures, video, and the like. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, computing environment 100 may be structured to support separate forward (160a and 160b) and reverse (170a and 170b) channel connections to facilitate the communication.

Computing environment 100 may be carried out as part of a larger network consisting of more than two devices. For example, DEV2 140 may exchange communications with a plurality of other devices (not shown) in addition to DEV1 110. The communications may be conducted using one or more communication protocols. Furthermore, computing environment 100 may include one or more intermediary nodes (not shown) that may buffer, store, or route communications between the various devices.

Figure 2:
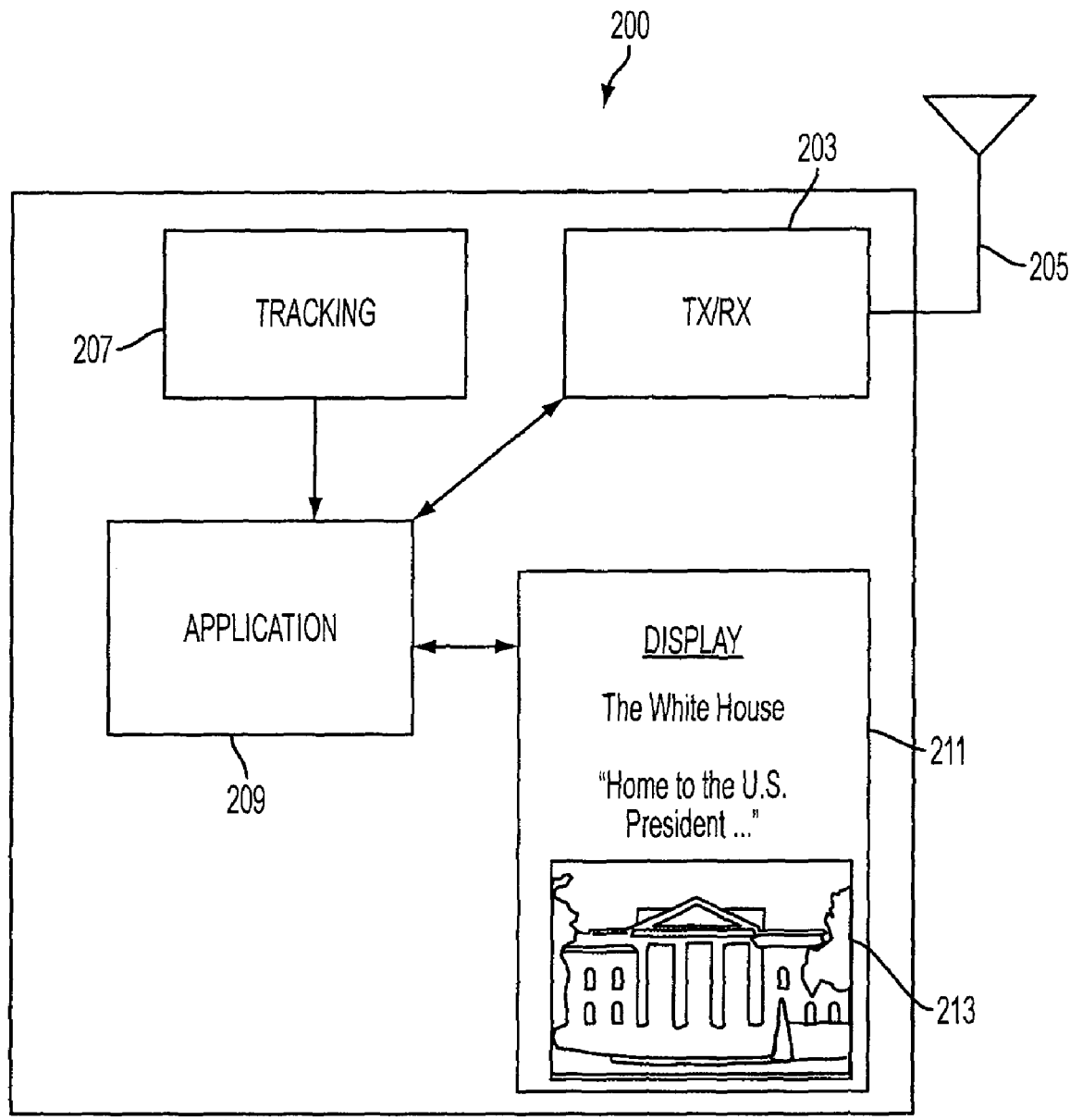
FIG. 2 illustrates a mobile device suitable for carrying out one or more illustrative aspects of the invention.

FIG. 2 illustrates a mobile device suitable for carrying out one or more illustrative aspects of the invention. More specifically, mobile device 200 may include a transmit/receive (Tx/Rx) module 203. Tx/Rx module 203 may work in conjunction with antenna 205 to transmit and receive signals with other mobile devices, base stations, and computing entities in general. Mobile device 200 may also include tracking module 207. Tracking module 207 may be based on any location tracking protocols or devices, and may include Global Positioning System (GPS) equipment, for example. Mobile device 200 may also include an application module 209. Application module 209 may be incorporated into mobile device 200 when mobile device 200 is fabricated. Alternatively, application module 209 and updates to application module 209 may be downloaded (e.g., via Tx/Rx module 203) to mobile device 200 after mobile device 200 is already in the field. Tx/Rx module 203 and tracking module 207 may provide inputs to application module 209. Application module 209 may operate on the one or more inputs it receives, and send the results of the operation(s) to Tx/Rx module 203 to be transmitted to other mobile devices, base stations, and other computing entities. Application module 209 may also communicate with display 211 to provide content suitable for display on mobile device 200. For example, in the context of having received information content related to the White House located in Washington, D.C., display 211 may show textual information related to the White House (e.g., "Home to the U.S. President . . . "). One or more videos and images may also be generated (in FIG. 2, a depiction of the White House 213 is shown). All of the referenced modules may be incorporated as software, hardware, firmware, or some combination thereof.

Figure 3:
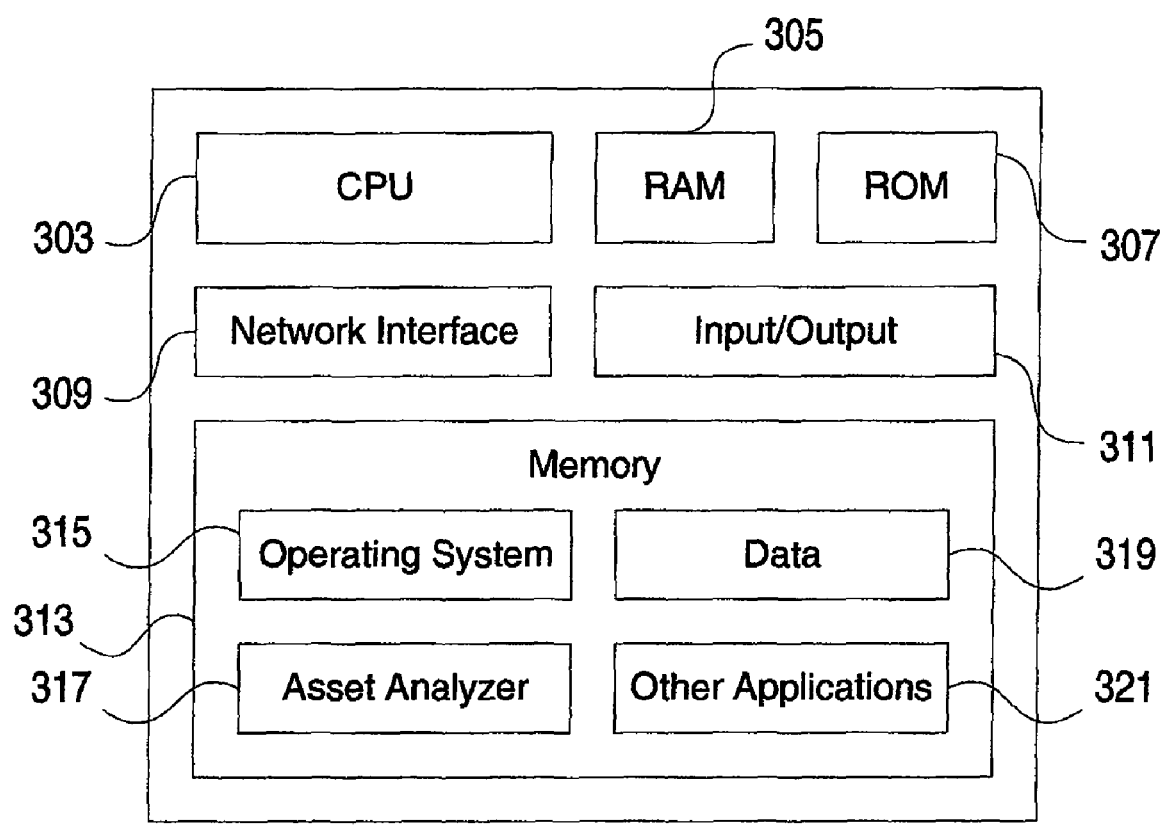
FIG. 3 illustrates a data processing architecture suitable for carrying out one or more illustrative aspects of the invention.

FIG. 3 illustrates a computer 300 that represents a generic computing device, e.g., a desktop computer, laptop computer, notebook computer, network server, portable computing device, personal digital assistant, smart phone, mobile telephone, terminal, distributed computing network device, or any other device having the requisite components or abilities to operate as described herein. Computer 300 may include central processing unit or other processor 303, RAM or other volatile memory 305, ROM or other boot memory 307, network interface(s) 309 (e.g., Ethernet, wireless network interface, modem, etc.) through which computer 300 connects to a network (e.g., Internet, LAN, WAN, Personal Area Network (PAN), etc.), input/output port(s) 311 (e.g., keyboard, mouse, monitor, printer, USB ports, serial ports, parallel ports, IEEE 1394/Firewire ports, and the like), and non-volatile memory 313 (e.g., fixed disk, optical disk, holographic storage, removable storage media, flash drive, etc.). Computer 300 may store various programs, application, and data in memory 313, including, but not limited to, operating system software 315, hardware/software/firmware asset analyzer 317, data 319 (e.g., historical data including past search results, and other data described herein), and other application(s) 321. Other applications 321 may include one or more applications to support location tracking, such as tracking via GPS.

Computer program product implementations may include a series of computer instructions fixed either on a tangible medium, such as a computer readable medium (e.g., a diskette, CD-ROM, ROM, DVD, fixed disk, etc.) or transmittable to computer system 300, via a modem or other interface device 309, such as a communications adapter connected to a network over a medium, which is either tangible (e.g., optical or analog communication lines) or implemented wirelessly (e.g., microwave, infrared, or other transmission techniques). The series of computer instructions may embody all or part of the functionality with respect to the computer system, and can be written in a number of programming languages for use with many different computer architectures and operating systems, as would be readily appreciated by one of ordinary skill. The computer instructions may be stored in any memory device, such as a semiconductor, magnetic, optical, or other memory device, and may be transmitted using any communications technology, such as optical infrared, microwave, or other transmission technology. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Various embodiments of the invention may also be implemented as hardware, firmware or any combination of software (e.g., a computer program product), hardware and firmware. Moreover, the functionality as depicted may be located on a single physical computing entity, or may be divided between multiple computing entities.

Figure 4:
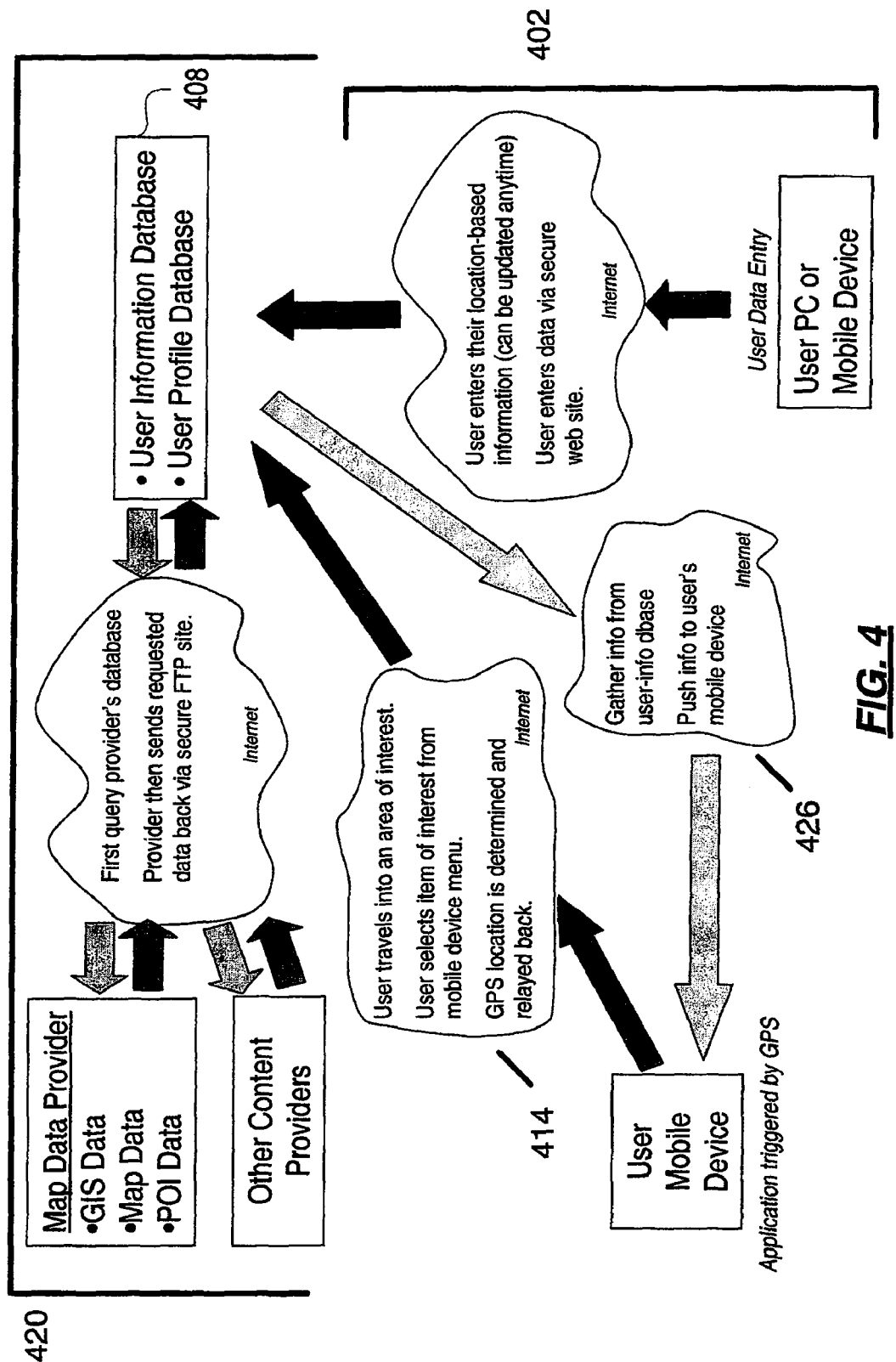
FIG. 4 illustrates a flow diagram suitable for carrying out one or more aspects of the invention described herein.

FIG. 4 illustrates a flow diagram suitable for demonstrating one or more aspects of the invention as described herein. Element 402 depicts a computer (e.g., computer 300) activating a profile. More specifically, element 402 demonstrates that a user may create and populate a user profile. The user profile may include information related to the user's preferences. For example, a user may enter information that indicates that he is interested in architecture or travel adventures.

User profiles (e.g., the profile generation demonstrated via element 402) may be protected via an authorization or authentication scheme. For example, to ensure integrity and security of data, a user may be required to enter a username and password, a personal identification number (PIN), or other identifying information to confirm that the user is who he claims to be. A user may have one profile for all informational content he may be interested in. For example, Andy, a potential user, may have a profile/account setup under his username "andyisbest," wherein Andy specifies that he has an interest in both architecture and tourism. Alternatively, or additionally, profiles may be setup for informational content related to each specific topic. Thus, Andy may have a first username "andyarchitecture" under which all of Andy's interests with respect to architecture are identified, and Andy may have a second username "andytourism" under which all of Andy's interests with respect to tourism/travel are identified. Accordingly, it is understood that while FIG. 4 only shows one generation element 402, in practice there may be multiple users generating profiles and each user may generate multiple profiles. The profiles may be generated from a single source computer. Alternatively, the multiple profiles may be generated via a plurality of computers.

Database 408 may be used to store the one or more user profiles that are generated via element 402. Database 408 may be implemented as any computing device/platform (e.g., computer 300). More specifically, database 408 may be implemented as a server and accompanying data storage. Access to database 408 may be restricted, wherein access may only be granted responsive to entry of a username and password, a PIN number, or the like. Moreover, access to database 408 may be restricted to a network administrator. In addition to element 402, database 408 may interact with other elements as discussed below.

Element 414 depicts a scenario wherein a user, carrying a mobile device, travels into an area of interest. For example, Andy may be visiting Washington, D.C. and may be on a sight-seeing tour. Andy may be in the proximity of the National Mall, and may desire additional information related to the National Mall. As such, and as shown via element 414, Andy may select an item of interest from a mobile device menu. Andy may enter text such as "National Mall" into his mobile device to express his desire for information related to the National Mall. Alternatively, or additionally, Andy's expressed interest in architecture as a part of his user profile, coupled with his presence in Washington, D.C. may result in Andy's mobile device recommending or forwarding information to him related to the monuments located within the National Mall without requiring Andy to identify the National Mall or the monuments therein explicitly. In order to determine that Andy is in proximity to the National Mall, a threshold distance parameter may be used in accordance with system-level characteristics. For example, a default (e.g., system-level) parameter may attempt to match user preferences with points of interest within ten miles of a mobile device's determined location. Alternatively, or additionally, the threshold distance parameter may be defined by a specific user and in conjunction with the corresponding user's profile. Thus, Andy may indicate in his user profile that he only desires information related to points of interest (e.g., the monuments located within the National Mall) within five miles of his mobile device's determined location.

Element 420 shows that a provider database (e.g., a Map Data Provider) may be queried for information related to the selected item of interest and (GPS) determined location provided via element 414. For example, the Map Data Provider shown may include geographic information system (GIS) data, map data and driving, walking, or bicycle directions, point of interest (POI) data, and the like. The data may include textual information, images and pictures, video, or the like. The data may also include user reviews, web blogs, and other information that would tend to convey user opinions related to the selected item of interest. The data provider may then send the requested data to database 408.

Element 420 includes, in addition to the Map Data Provider, a "Other Content Providers" database to provide useful, interesting, and detailed content about locations, buildings, sites, goods, services and the like. The Other Content Providers may reside in parallel with the Map Data Provider as shown in the embodiment of FIG. 4, both serving to provide information to a user (e.g., Andy). Alternatively, the Other Content Providers and the Map Data Provider may be arranged in a sequential manner such that the two communicate or collaborate to provide information that represents a combination of the information provided by each, or information that represents a selection between the two.

In accordance with the above description of element 420, one of skill in the art will appreciate that the data provider shown in 420 may only need to be consulted the first time that information related to a given topic is requested. Once information related to a given topic has been requested, that information may be retained in database 408 for future use either by the same user or by another user. Thus, bandwidth with respect to the data provider shown in 420 may be conserved by minimizing the number of information-transactions that need to take place between the data provider shown in 420 and database 408. A request queue may also be established in database 408 in order to conserve bandwidth, such that a specific data provider (e.g., the map data provider shown in 420) is only accessed when a sufficient number of requests have been received at database 408 to access the specific data provider, thereby increasing the proportion of informational data in comparison to signaling overhead. Furthermore, informational requests may be prioritized based on a tiered subscription fee (e.g., $19.99 a month for highest grade service, $5.99 a month for lowest grade service) or the like, thereby providing different classes or categories of prioritized service. If security is a concern, the data may be protected, or access may be restricted based on successful entry of a password, a PIN number, or the like.

Element 426 depicts information gathered from the map data provider shown in 420, and information retrieved from database 408 being transmitted to the user mobile device. A queue similar to the one described above between the map data provider of element 420 and database 408 may also be established between database 408 and the user mobile device to conserve bandwidth (e.g., to minimize signaling overhead with respect to informational content). Thus, the user mobile device may receive informational content in bursts, based on when the number of requests exceeds a predetermined threshold.

Returning to the example of Andy requesting information related to the National Mall, once Andy's mobile device obtains information regarding the National Mall (e.g., in accordance with the elements described above in conjunction with FIG. 4), Andy's mobile device and Andy himself may select, filter, and verify the nature of the information presented. For example, desirable information may be returned to Andy regarding the monuments (e.g., the Lincoln Memorial, the Washington Monument, etc.) located within the National Mall. Andy's request, however, may have also resulted in information being returned related to a nearby shopping mall that is selling merchandise affiliated with the Washington Nationals baseball team, due to the inclusion of similar terms (e.g., "mall" and "Nationals"). Andy or Andy's mobile device may select the information that is of interest based on his particular location (e.g., the information related to the Lincoln Memorial, the Washington Monument, and the like, since Andy is located at the National Mall), and a link may be generated based on the selection for subsequent use. The link may take the form of a hyperlink, and the link may in turn reference one or more additional links. More generally, the link may reference a record, database or the like to retrieve information from an information source. Thereafter, when a new user (or even Andy on a future occasion) expresses a desire for information when similarly located within a threshold distance of the National Mall, the link may be used (subject to security constraints) to transmit the selected information to the new user's mobile device. The information referred to by the link may be updated over time as more information becomes available and as users subsequently critique (e.g., via their selections) the information they are presented with. Alternatively, or additionally, a ranking or rating system may be used to provide users with a confidence level indication as to the potential relevancy of the information included.

One of skill in the art will appreciate that a user may have an opportunity to plan a trip using one or more aspects of the invention described herein. For example, Andy may access an internet browser application on a computing device (e.g., computer 300) while at home in Boston, Mass. for the purposes of planning a trip to Washington, D.C. Andy may have determined that he is staying at a hotel located at the corner of $17^{th}$ Street and K Street in Washington, D.C., and Andy may want to obtain information related to buildings, events, sites, and the like that are of interest to him in a relatively close proximity to the hotel. Andy may perform a search using the internet browser application to retrieve one or more links providing information related to buildings, events, sites, and the like in the vicinity of the hotel. The search may be constrained by imposing a threshold distance that may not be exceeded to ensure proximity to the hotel (e.g., a circular distance may be used with the hotel serving as the center point). Andy may then pre-select information and save it to a database, a link or the like in advance of his trip to Washington, D.C.

In view of the foregoing description associated with FIG. 4, the one or more links may be the result of previous users' contributions, and thus, Andy may be able to leverage off of the previous users' experiences and reviews and may use those links when taking his trip to Washington, D.C. Alternatively, or additionally, Andy may be able to create a new link, and port some or all of the information referenced by other users' links over to the new link. For example, other users' links may be made available as part of a virtual community or the like. Alternatively, or additionally, user links may be included as part of (web page) search results or the like.

The new link may also be supplemented with additional search information that Andy locates on his own (e.g., Andy may locate a web site/homepage of an Irish bar that happens to be located near his hotel). Andy may also be able to create information to be added to the link. For example, Andy may view a picture of the Lincoln Memorial on his computing device while at home in Boston, and may proceed to prepare a written opinion (e.g., via a text document) regarding the Lincoln Memorial's shape, size, use of materials, and the like. The written opinion may be prepared on Andy's computing device, an additional computing device (e.g., a mobile device) or the like.

When Andy arrives in Washington, D.C., his arrival may trigger the information Andy pre-selected (e.g., while he was in Boston) being sent to his mobile device. The information may also be overlaid on top of a map or the like, providing Andy a visual sense of where the various points of interest are located. Andy may also supplement the information after having visited the points of interest; for example, Andy may update his earlier written opinion regarding the Lincoln Memorial to include an estimate of how many vendors were set up near the Lincoln Memorial selling beverages, snacks and the like. Andy may also make his written opinion, or any additional information he decides to add, available for other users to view at their own computing platforms (e.g., Andy may "publish" the information and have it associated with the subject location). Alternatively, Andy may be able to keep his information (e.g., his written opinion) to himself in order to maintain privacy and secrecy.

With respect to repeated occurrences of a single user (e.g., Andy) visiting a given area or geographical location, hysteresis may be implemented to prevent repeatedly sending the same content or data to a user who happens to be traveling along a path that largely coincides with the threshold distance (e.g., a circular path). The hysteresis may be based on a distance parameter and a time parameter, and may be fixed or variable. The hysteresis may be conditioned on the basis of a user account or login name to enable multiple users of a single computing platform to obtain the same information that would otherwise be blocked by the hysteresis.

Figure 5:
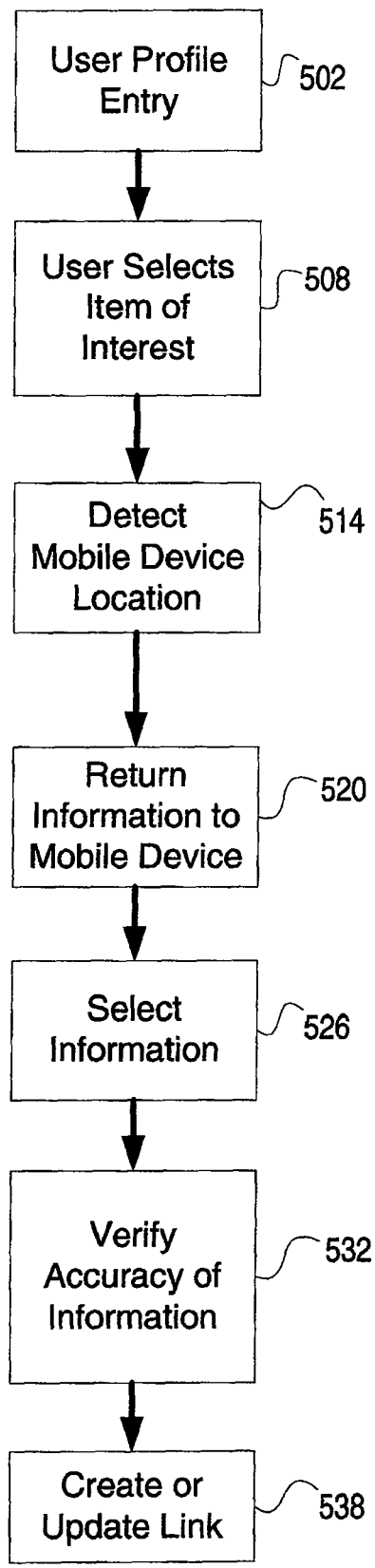
FIG. 5 illustrates a flow chart suitable for carrying out one or more aspects of the invention described herein.

FIG. 5 illustrates a flow chart suitable for demonstrating one or more aspects of the invention described herein. In step 502, a user may enter his preferences as profile information (e.g., in accordance with the preceding description of element 402 of FIG. 4). In step 508, the user may select or enter an item or topic of interest that the user has an interest in obtaining more information about (e.g., in accordance with the preceding description of element 414 of FIG. 4). For example, the user may depress a button or switch on a mobile device, and a menu may be generated on the display of the mobile device responsive thereto. The user may select an item of interest from a listing of candidate items of interest. The listing of candidate items of interest may include items that a user pre-selected. The listing of candidate items of interest may also include items that are included in a user profile. Alternatively, or additionally, the user may enter text to indicate a desire for more information related to the entered text. The user may subsequently push an "ok" or "confirm" button to lock-in his selection.

In step 514, the mobile device may detect its current location (e.g., in accordance with the preceding description of element 414 of FIG. 4). Alternatively, the mobile device's current location may be determined by a server or the like as part of a network, wherein the server is configured to conduct a triangulation process or the like to determine the mobile device's current location. Thereafter, the server may send the determined location, as coordinates or the like, to the mobile device. In step 520, information related to the selected or entered item of interest may be returned to the user mobile device (e.g., in accordance with the preceding description of element 426 of FIG. 4), based on the selected and entered item or topic of interest in step 508 and the location determined in step 514. The information may be returned as a link when the information is sufficiently related to a previous informational request. As per the preceding description, the link may take the form of a hyperlink, and the link may in turn reference one or more additional links. More generally, the link may reference a record, database or the like to retrieve information from an information source.

In step 526, the user or the user mobile device may select the returned information for purposes of ensuring accuracy or relevancy. In step 532, the user may verify the information of step 526 to ensure it is relevant to the location detected in step 514. The user verified information may be sent to a server or the like (not shown) for subsequent use or critique by future users. In step 538, a link may be established in the first instance, or information referred to by the link may be updated, relating the selected information of step 526 to the geographical location and the selected or entered item or topic of interest. Further details related to verification of information are provided below.

One of skill in the art will appreciate that steps 514, 532 and 538 may work together (potentially with one or more additional steps) to ensure that (only) information relevant to a specified location is available for future use. For example, a user in the vicinity of the National Mall in Washington, D.C. may request information related to the White House (where the President of the United States works and resides). The user may inadvertently select (e.g., via step 526) information that refers to a house that is painted white, but is located in Arlington, Va. In order to promote reliable and accurate information, step 532 may serve to prohibit adding the information related to the house located in Arlington, Va. to the link of step 538 when the user's location was determined to be 1600 Pennsylvania Avenue, Washington, D.C., in conjunction with step 514. Thus, future users of the link referred to by step 538 will not be presented with (e.g., burdened by) information that is likely to be of little relevance when they are in the proximity of the White House in Washington, D.C.

One or more of the steps described in conjunction with FIG. 5 may be optional. For example, a user might not be required to enter or populate a user profile (e.g., step 502). Furthermore, some steps may be interchanged. For example, a user may create a profile (e.g., step 502) after selecting and entering an item or topic of interest that the user has an interest in obtaining more information about (e.g., step 508). Additionally, step 514 (detect mobile device location) may be conducted before step 508 (user selects item of interest) in order to narrow the scope of candidate items of interest based on the detected location.

Figure 6A:
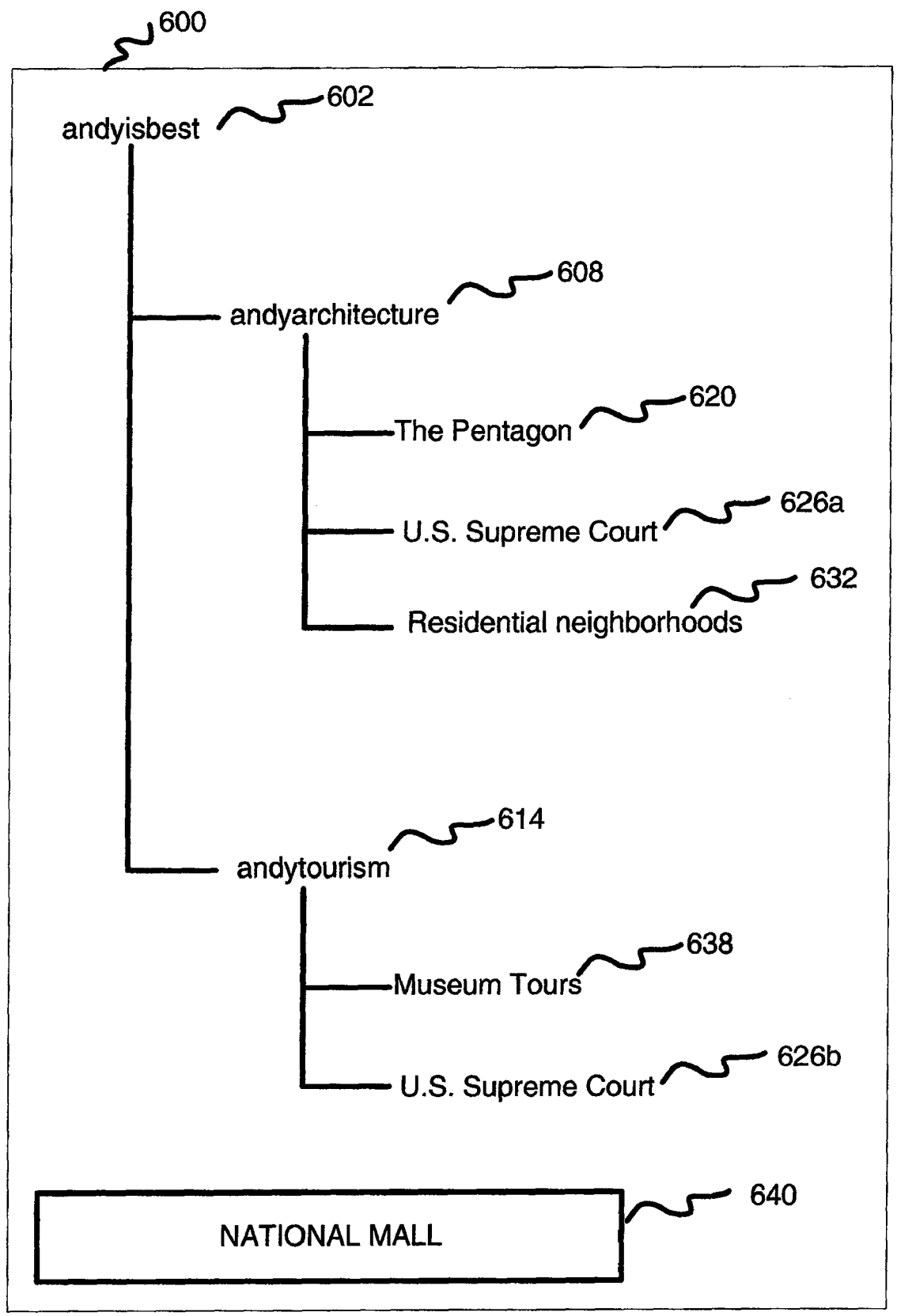
FIG. 6A illustrates a screen-shot of a menu suitable for demonstrating one or more aspects of the invention described herein.

FIG. 6A illustrates a screen-shot menu that may be presented to a user of a computing device (e.g., a mobile device) in accordance with one or more aspects of the invention described herein. More specifically, FIG. 6A demonstrates that a user (named Andy) may be presented with a menu 600. Menu 600 may be generated responsive to Andy pressing a button, switch or the like on his mobile device, or menu 600 may be generated upon detecting that Andy's mobile device substantially changed its location (e.g., that Andy or Andy's mobile device has changed its location by more than one hundred miles from a previously determined location). Menu 600 reflects Andy's general profile username "andyisbest" 602. Under Andy's general profile username 602 are sub-profiles "andyarchitecture" 608 and "andytourism" 614. The sub-profiles in turn may reference recommended sites based on a determined location. For example, if Andy is in close proximity to Washington, D.C., then the Pentagon 620, the U.S. Supreme Court 626a, and residential neighborhoods 632 may all be sites or destinations Andy may have an interest in as it relates to architecture (e.g., subprofile "andyarchitecture" 608). Similarly, museum tours 638 and the U.S. Supreme Court 626b may be sites Andy may have an interest in as it relates to tourist attractions (e.g., in accordance with subprofile "andytourism" 614). As the foregoing example demonstrates, one or more sites (e.g., U.S. Supreme Court 626) may be referenced by more then one sub-profile.

Menu 600 may also provide a text box 640 for data entry. For example, as shown in FIG. 6, Andy entered "National Mall" into text box 640. Text box 640 may provide an opportunity to acquire information related to a topic or site that is not provided under Andy's profile (e.g., "andyisbest" 602) or sub-profiles (e.g., "andyarchitecture" 608 or "andytourism" 614). The text entered via text box 640 may be confirmed via the depression of a key or button (not shown in FIG. 6A). Alternatively, or additionally, a timer may be implemented such that a timer starts running once the user stops entering text, and when the elapsed time exceeds a threshold, the device may assume that the user desires more information related to the entered text. Once the menu/mobile device has determined that more information is desired related to a topic entered in text box 640, the mobile device may send out a query and receive search results responsive to the query.

Text box 640 is shown as supporting words or phrases. One of skill in the art will appreciate that symbols, numbers or the like may also be supported. Furthermore, text box 640 may be replaced or supplemented by speech recognition technologies, allowing a user to verbally request information on a topic or site.

Figure 6B:
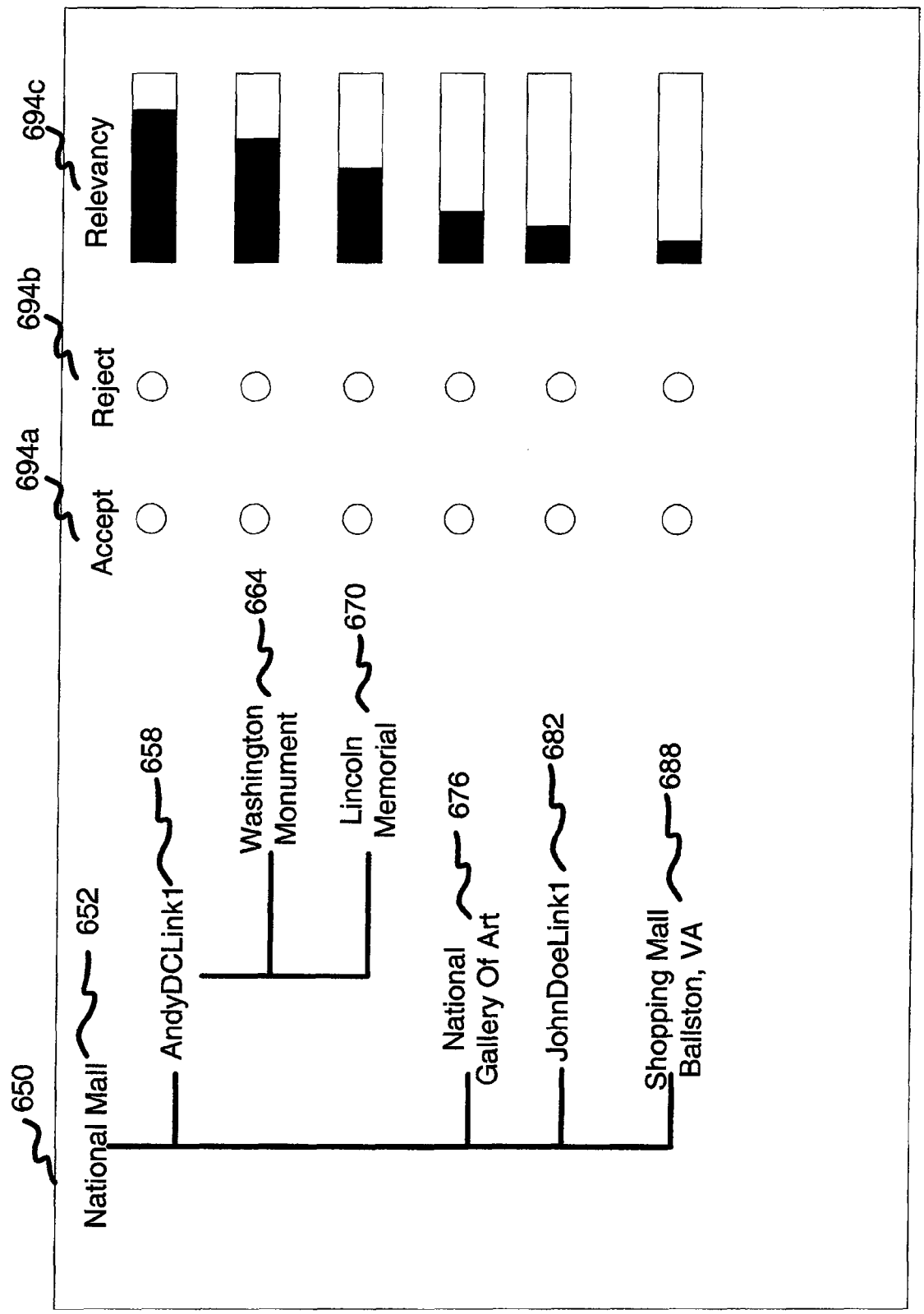
FIG. 6B illustrates a screen-shot of a menu suitable for demonstrating one or more aspects of the invention described herein.

FIG. 6B illustrates a screen-shot menu 650 that may be presented to a user of a computing device (e.g., a mobile device) in accordance with one or more aspects of the invention described herein. More specifically, FIG. 6B screen-shot menu 650 may be useful in facilitating verification of selected information (e.g., in accordance with the verification conducted as discussed above in conjunction with step 532 of FIG. 5). For example, assuming that Andy entered "National Mall" into text box 640 of FIG. 6A, menu 650 may provide search results. The search results may be presented in a tree like manner with the selected topic "National Mall" shown as the root of the tree (at root node 652).

Underneath National Mall 652 the various search results may be provided. The search results themselves may be links, hyperlinks, pictures, videos, text documents, or the like, or any combination thereof. The search results may originate from a social community, grouping, or the like wherein user critiques of the search results influence what information is included responsive to a search query.

For example, as shown in FIG. 6B, AndyDCLink1 658 may be a first search result, and a link that Andy prepared while in Boston, Mass. in preparation for a trip from Boston to Washington, D.C. Under AndyDCLink1 658, additional search results may be provided; as shown, information related to the Washington Monument 664 and the Lincoln Memorial 670 may be provided. The Washington Monument 664 and the Lincoln Memorial 670 related information may have been added to AndyDCLink1 658 as pre-selected information while Andy was still in Boston.

Continuing with the example shown in FIG. 6B, an additional search result may include the National Gallery of Art 676. Moreover, the search results may include a link belonging to another user, in this case, John Doe (e.g., JohnDoeLink1 682). John Doe may be a personal friend of Andy's and may have approved of (only) Andy being able to gain access to his link. Alternatively, or additionally, John Doe may have uploaded his link (and information associated with his link, not shown) to a server, a database or the like as part of a larger user community. An additional link related to a shopping mall located in Ballston, Va. may also be provided (e.g., Shopping Mall Ballston, Va. 688), likely due to the inclusion of the string "Mall" in its name and given that the search topic was "National Mall" 652.

FIG. 6B also provides for a number of user inputs/outputs that may facilitate Andy's selection of search results and corresponding information. More specifically, menu 650 may include accept inputs 694*a*, reject inputs 694*b*, and relevancy outputs 694*c* for each of search results 658-688.

Relevancy outputs 694*c* may be used to represent what is perceived to be the relative relevancy of each search result based on the search topic 652. For example, as shown in FIG. 6B, AndyDCLinkl 658 is shown as having the greatest amount of shading for its corresponding relevancy output 694*c*, and hence, may be deemed the most relevant search result provided. Conversely, Shopping Mall Ballston, Va. 688 is shown as having virtually little relevancy (by virtue of the limited amount of shading). As such, relevancy output 694*c* may assist Andy in determining which information is likely to be of greatest relevance.

Relevancy output 694*c* may be determined in accordance with other users' ratings of the information. For example, Andy may be near the "Reflecting Pool" in close proximity to both the Washington Monument (664) and the Lincoln Memorial (670). Other users, when situated near the Reflecting Pool in the past, may have given a high rating (e.g., in accordance with the rating discussion below) to the information referred to by search result Washington Monument 664 and Lincoln Memorial 670, which may explain the relatively high relevancy output 694*c* associated with each. As Andy moves around, the relevancy output 694*c* associated with each search result may update. For example, Andy may take a cab ride from a location near the Reflecting Pool to Ballston, Va., and as a result, relevancy output 694*c* associated with search result Shopping Mall Ballston, Va. 688 may increase (e.g., the shading associated with it may increase), whereas the shading associated with the Washington Monument 664 and the Lincoln Memorial 670 relevancy outputs 694*c* may decrease.

As described above, the relevancy outputs 694*c* may be influenced based on users' ratings of search results. This rating may be carried out using accept inputs 694*a* and reject inputs 694*b*. For example, when Andy is in close proximity to the Reflecting Pool, he may view the information associated with search result Washington Monument 664 and Lincoln Memorial 670, and he may determine that the information provided is highly relevant to his current location. Accordingly, Andy may select the accept inputs 694*a* associated with each of Washington Monument 664 and Lincoln Memorial 670. Alternatively, or additionally, Andy may select the accept input 694*a* associated with AndyDCLinkl, and that selection may "trickle down" to the accept inputs 694*a* associated with Washington Monument 664 and Lincoln Memorial 670. Andy may also take a step of rejecting the search result Shopping Mall Ballston, Va. 688 when in proximity to the Reflecting Pool by selecting the reject input 694*b* that corresponds to Shopping Mall Ballston, Va. 688. The relevancy ratings associated with relevancy outputs 694*c* may subsequently be updated and transmitted to a server, database, or the like. Thereafter, additional users may access (e.g., download) relevancy outputs 694*c* on their own mobile devices, wherein the relevancy outputs 694*c* may reflect Andy's relevancy ratings. As such, the additional users may make selections of search results based on the feedback (in the form of relevancy ratings) that Andy has provided.

Andy's relevancy ratings may be given the same weight as all other users (e.g., each user's relevancy ratings may be weighted equally) when incorporating Andy's relevancy ratings into newly calculated (e.g., recalculated) relevancy outputs 694*c* stored at the server. Alternatively, or additionally, one or more users' relevancy ratings may be given greater weight in comparison to other users.

One or more outputs (not shown in FIG. 6B) may be included in addition to (or in place of) relevancy outputs 694*c*. For example, in some embodiments, popularity outputs are provided that indicate a corresponding link's popularity (e.g., in terms of how frequently it has been viewed). In other embodiments, the outputs indicate how recent a corresponding link was posted. For example, links that have been recently posted may be favored over those that are older and potentially contain outdated information. The additional outputs (e.g., the outputs based on popularity and recency) may be provided separate from relevancy outputs 694*c*. Alternatively, the additional outputs may serve as a weighting factor in the relevancy indicated by a relevancy output 694*c*. For example, the relevancy output 694*c* corresponding to the Washington Monument 664 of FIG. 6B may be enhanced by the fact that a lot of people have previously chosen to view the information associated with Washington Monument 664, and hence, Washington Monument 664 may have a relatively high popularity output.

One of skill in the art will appreciate that alternatives to accept inputs 694*a* and reject inputs 694*b* may be available. For example, rather then providing a discrete instance of each, accept inputs 694*a* and reject inputs 694*b* may be combined along a continuum to allow a continuous evaluation to take place. More specifically, users may be provided an input to allow a relevancy to be determined along a continuum much like the relevancy outputs 694*c*.

In order to promote usage of the accept inputs 694*a* and reject inputs 694*b*, a user may receive a reward or the like. Moreover, the nature of the reward may be conditioned based on the accuracy of a user's selection in order to promote accurate user ratings (e.g., to discourage frivolous or erroneous ratings).

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

receiving, at a mobile device, information related to places of interest within a distance of a location of the mobile device;

displaying an identification of each of the places of interest with a plurality of relevancy outputs in a display, each relevancy output corresponding to one of the places of interest and each relevancy output incorporating acceptances and rejections of a corresponding place of interest for a plurality of users;

while displaying the identification of each of the places of interest with the plurality of relevancy outputs in the display, receiving, at the mobile device, a user selection between an accept input that accepts a first place of interest of the places of interest and a reject input that rejects the first place of interest;

when the user selection accepts the first place of interest, displaying an increased relevancy output for the first place of interest while displaying the identification of each of the places of interest in the display; and when the user selection rejects the first place of interest, displaying a decreased relevancy output for the first place of interest while displaying the identification of each of the places of interest in the display.

2. The method of claim 1, wherein the information related to the places of interest includes first information pre-selected by a user and second information pre-selected by a different user, wherein a first link to the first information and a second link to the second information are included in the display while displaying the identification of each of the places of interest and the relevancy outputs.

3. The method of claim 2, wherein the link is a published link that is accessible by other computing devices in addition to the mobile device.

4. The method of claim 2, wherein the first information was prepared by the user using an internet browser application on a computing device that is different than the mobile device.

5. The method of claim 1, wherein the distance is based on information contained in a profile pre-established by a user.

6. The method of claim 1, wherein the information related to the places of interest includes at least one user opinion related to the places of interest.

7. The method of claim 1, further comprising a step of providing directions to the places of interest.

8. The method of claim 1, wherein the information related to the places of interest includes a link that is displayed in the display while displaying the identification of each of the places of interest in the display, and wherein the link identifies that additional information related to at least one of the places of interest is available, and the method further comprises:
   receiving a selection of the link;
   displaying the additional information; and
   receiving user input that modifies or supplements the additional information.

9. The method of claim 1, further comprising:
   when the user selection accepts the first place of interest, the mobile device incorporating the user selection into a relevancy output corresponding to the first place of interest, resulting in the increased relevancy output; and
   when the user selection rejects the first place of interest, the mobile device incorporating the user selection into the relevancy output corresponding to the first place of interest, resulting in the decreased relevancy output.

10. The method of claim 1, further comprising transmitting an updated relevancy output to a server.

11. The method of claim 1, wherein hysteresis is implemented to prevent the mobile device from repeatedly receiving the information related to the places of interest.

12. The method of claim 1, wherein the method further includes a step of adding information created at the mobile device to the information related to the places of interest.

13. The method of claim 1, wherein the first place of interest is associated with one or more additional places of interest from the places of interest and the method further comprises:
   upon the user selection accepting the first place of interest, automatically selecting accept inputs corresponding to the one or more additional places of interest.

14. The method of claim 1, wherein the information related to the places of interest includes text of the places of interest, pictures of the places of interest, and hyperlinks to content related to the places of interest.

15. An apparatus comprising:
   a processor; and
   a memory configured to store computer readable instructions that, when executed by the processor, cause the apparatus to:
   receive information related to places of interest within a distance of a location of the apparatus;
   display an identification of each of the places of interest with a plurality of relevancy outputs and a geographic map in a display screen, each relevancy output corresponding to one of the places of interest and each relevancy output incorporating acceptances and rejections of a corresponding place of interest for a plurality of users, wherein the identification of each of the places of interest is overlaid on the geographic map to provide a visual indication of a geographic location of the corresponding place of interest;
   while displaying the plurality of relevancy outputs with the identification of each of the places of interest overlaid on the geographic map, receive a user selection between an accept input that accepts a first place of interest of the places of interest and a reject input that rejects the first place of interest;
   when the user selection accepts the first place of interest, display an increased relevancy output for the first place of interest while displaying the identification of each of the places of interest and the geographic map in the display screen; and
   when the user selection rejects the first place of interest, display a decreased relevancy output for the first place of interest while displaying the identification of each of the places of interest and the geographic map in the display screen.

16. The apparatus of claim 15, wherein the information related to the places of interest includes a link that is displayed in the display screen while displaying the plurality of relevancy outputs with the identification of each of the places of interest overlaid on the geographic map in the display screen, and wherein the link identifies that additional information related to at least one of the places of interest is available, and the memory further stores computer readable instructions that, when executed by the processor, cause the apparatus to:
   receive a selection of the link,
   display the additional information, and
   receive user input that modifies or supplements the additional information.

17. The apparatus of claim 15, wherein the memory further stores computer readable instructions that, when executed by the processor, cause the apparatus to
   when the user selection accepts the first place of interest, incorporate the user selection into a relevancy output corresponding to the first place of interest, resulting in the increased relevancy output; and
   when the user selection rejects the first place of interest, incorporate the user selection into the relevancy output corresponding to the first place of interest, resulting in the decreased relevancy output.

18. The apparatus of claim 15, wherein the memory further stores computer readable instructions that, when executed by the processor, cause the apparatus to implement hysteresis to prevent the apparatus from repeatedly receiving the information related to the places of interest.

19. An apparatus comprising:
   a processor; and
   a memory configured to store computer readable instructions that, when executed by the processor, cause the apparatus to:
   receive, from a mobile device, a request for information related to a topic;
   determine if the apparatus already contains information related to the topic;
   when the apparatus already contains the information, transmit the information to the mobile device as results;

when the apparatus does not already contain the information, request the information from a data provider, receive the information from the data provider, store the information at the apparatus, and transmit the information to the mobile device as results;

receive data representing a user selection between an accept input that accepts a first result of the results and a reject input that rejects the first result; and in response to receiving the data representing the user selection, calculate a relevancy output corresponding to the first result that includes a value calculated as a function of the user selection and a location of the mobile device, and transmit the relevancy output.

20. The apparatus of claim 19, wherein the memory further stores computer readable instructions that, when executed by the processor, cause the apparatus to:

transmit the results to the mobile device as a link, and wherein the results are stored at the apparatus, receive, from the mobile device, data identifying a selection of the link, in response to receiving the data identifying the selection of the link, provide first information related to places of interest to the mobile device, and receive, from the mobile device, data that modifies or supplements the first information.

21. The apparatus of claim 20, wherein the memory further stores computer readable instructions that, when executed by the processor, cause the apparatus to:

receive content data from a computing device that is different than the mobile device;

update the results stored at the apparatus responsive to the received content data.

22. The apparatus of claim 20, wherein the results include second information related to one or more places of interest, the second information being pre-selected by a user, wherein the results include third information related to one or more places of interest, the third information being provided by a different user, wherein at least one of the second information and the third information is part of the first information, and wherein the memory further stores computer readable instructions that, when executed by the processor, cause the apparatus to update the second information and the third information in accordance with the data that modifies or supplements the first information.

23. A method comprising:

receiving, at a computing device and from a mobile device, a request for information related to a topic;

determining if the computing device already contains information related to the topic; and when the computing device already contains the information, transmitting the information to the mobile device as results; and when the computing device does not already contain the information, requesting the information from a data provider, receiving the information from the data provider, storing the information at the computing device, and transmitting the information to the mobile device as results;

receiving data representing a user selection between an accept input that accepts a first result of the results and a reject input that rejects the first result; and in response to receiving the data representing the user selection, calculating a relevancy output corresponding to the first result that includes a value calculated as a function of the user selection and a location of the mobile device, and transmitting the relevancy output.

* * * * *